US 8,884,750 B2

(12) United States Patent
Bacal

(10) Patent No.: US 8,884,750 B2
(45) Date of Patent: Nov. 11, 2014

(54) INHIBITING DISTRACTING OPERATIONS OF PERSONAL HANDHELD DEVICES BY THE OPERATOR OF A VEHICLE

(76) Inventor: Benjamin Bacal, West Hollywood, CA (US)

( * ) Notice: Subject to any disclaimer, the term of this patent is extended or adjusted under 35 U.S.C. 154(b) by 191 days.

(21) Appl. No.: 13/452,845

(22) Filed: Apr. 21, 2012

(65) Prior Publication Data
US 2013/0278405 A1  Oct. 24, 2013

(51) Int. Cl.
*B60Q 1/00* (2006.01)
*H04K 3/00* (2006.01)

(52) U.S. Cl.
CPC . *B60Q 1/00* (2013.01); *H04K 3/415* (2013.01)
USPC .......................... 340/439; 340/425.5; 340/3.1

(58) Field of Classification Search
CPC ............ B60K 28/063; B60R 11/0241; B60R 2011/0054; H04M 1/6075; H04M 1/72577
See application file for complete search history.

(56) References Cited

U.S. PATENT DOCUMENTS

| 6,138,041 | A | * | 10/2000 | Yahia | 455/569.2 |
| 7,212,842 | B1 | * | 5/2007 | Seymour | 455/573 |
| 2006/0255960 | A1 | * | 11/2006 | Uken et al. | 340/815.4 |
| 2007/0127644 | A1 | * | 6/2007 | Tischer et al. | 379/93.02 |
| 2009/0149168 | A1 | | 6/2009 | McLean | |
| 2009/0184800 | A1 | * | 7/2009 | Harris | 340/5.21 |
| 2010/0009626 | A1 | | 1/2010 | Farley | |
| 2010/0062788 | A1 | | 3/2010 | Nagorniak | |
| 2010/0113073 | A1 | | 5/2010 | Schlesener et al. | |
| 2010/0210254 | A1 | | 8/2010 | Kelly et al. | |
| 2010/0297929 | A1 | | 11/2010 | Harris | |
| 2010/0297930 | A1 | * | 11/2010 | Harris | 455/1 |
| 2011/0077032 | A1 | | 3/2011 | Correale et al. | |
| 2011/0136469 | A1 | * | 6/2011 | Rathus et al. | 455/410 |
| 2012/0253552 | A1 | * | 10/2012 | Skelton | 701/2 |
| 2013/0151111 | A1 | * | 6/2013 | Skelton | 701/99 |

* cited by examiner

*Primary Examiner* — Travis Hunnings

(57) ABSTRACT

A warning system is configured to alert a driver if a mobile electronic device present in the vehicle is located outside a designated area of the vehicle, such that it might distract the driver. The designated area can be any surface or retaining area with an associated sensor that can detect the presence of the mobile device. If the driver removes the mobile device from the designated area while driving, the driver will have a predetermined period of time to return the mobile device to the designated area before an alert is generated. If the mobile device is not returned within the predetermined period of time, the alert is generated.

24 Claims, 3 Drawing Sheets

INHIBITING DISTRACTING OPERATIONS OF PERSONAL HANDHELD DEVICES BY THE OPERATOR OF A VEHICLE

BACKGROUND

Mobile devices including cellular telephones, personal digital assistants, personal access devices and other portable electronics have experienced rapid growth over the past few decades. Use of such devices by the operator of a motor vehicle can pose a distraction and increase the likelihood of an accident due to inattention to driving activities. Various solutions have been suggested to reduce distracted driving caused by the use of mobile devices.

SUMMARY

The presence of a mobile or portable electronic device (PED) within a designated area within a vehicle is detected. The vehicle can be a motor vehicle, airplane, train or other mode of transportation. The designated area may be any area within the vehicle associated with a sensor capable of detecting the presence of the device within the designated area. The designated area may be outside the reach or view of the driver. The designated area may be integral to the vehicle, such as a center console, armrest, glove compartment, designated shelf region, dashboard, or other surface or retention area with an associated sensor, or may be a separate structure such as a dedicated holster or other structure for retaining the PED with a sensor.

If the PED is not within the designated area of the vehicle, an alert is provided, preferably after some time delay, to prompt the operator to return the device to the designated area. The alert can be any perceptible signal, such as a sound (e.g., beeping, music, noise), visible cue (e.g., a light), and the like. A distraction reduction device (DRD) may be activated upon application of power to the DRD (e.g., by receiving power from the vehicle via a power plug integrated into the holster) and initial positioning of the PED into the designated area.

Positioning of the PED within the designated area may be detected in a number of ways. For example, its presence can be detected by sensing pressure applied to a designated surface supporting or retaining the PED due, for example, to the weight of the PED. As another example, its proximity to an area can be detected through various electronic signals, such as wireless communication signals and the like. Alternatively and in addition, other methods and techniques may be used to detect the presence of the PED within the vehicle, whether it is positioned within the designated area or otherwise, and whether the vehicle is being or is likely to be operated in a manner such that distractions may be reduced or eliminated by having the portable device in the designated area. The DRD itself may limit access to and/or inhibit or restrict certain operations of the PED.

Computer-readable media, such as CD, RAM, ROM, or other storage devices, may store program instructions that are executable by one or more processors to implement any of the methods disclosed herein.

It is to be understood that both the foregoing general description and the following detailed description are exemplary and explanatory only and are not restrictive of the claimed invention.

DETAILED DESCRIPTION

Figure 1:
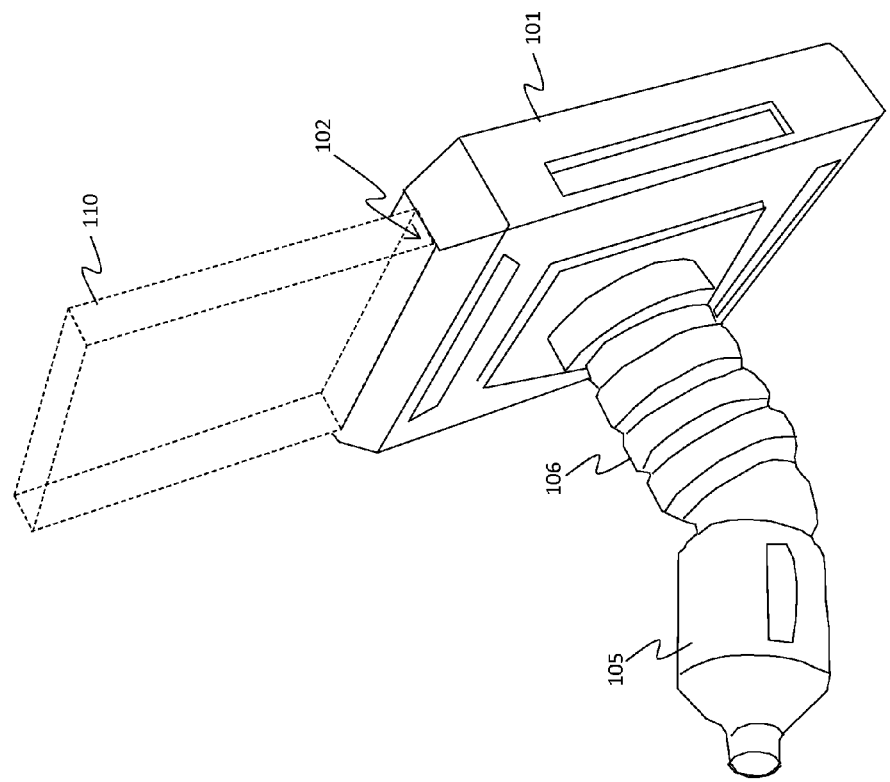
FIG. 1 is a front perspective view of a vehicular-mountable device for retaining and inhibiting operation of a portable electronic device (PED) present within a vehicle.

The following description includes example implementations of methods and systems for detecting the presence of a portable electronic device (PED) within a vehicle and alerting an operator of the vehicle to inhibit distracting operations of the portable device, such as by locating the portable device within a designated area of the vehicle, preferably where the device will not be a distraction to the operator. For example, the designated area may be a portion of the dashboard, center or other console, glove compartment, armrest, or other integral structure of the car, or may a separate structure, such as a holster, into which the portable device is inserted such that the structure restricts access to and/or certain operations of the portable device.

Various sensors may be used for detecting the presence of the portable device, either by action of the vehicle operator (e.g., sensing the weight of the device if an area of the vehicle on which the portable device is positioned, by inserting the device into a holster that retains the device, etc.) or automatically (e.g., by sensing and/or detecting an RF signal radiated by the portable device.) Alerts to the vehicle operator may be dependent upon an operation of the vehicle (e.g., whether the vehicle is in motion) and/or other conditions (e.g., whether a passenger is present in the vehicle or an emergency situation exists.)

In one implementation, a distraction reduction device is responsive to the presence of a mobile electronic device located within and/or outside of a designated portion of the vehicle. The designated portion of the vehicle may be integral to the vehicle or a separate structure such as a holster that is configured to retain a mobile electronic device such a smart phone, of which an iPhone device and a BlackBerry device are examples. In the case of a holster it may include an electrical connector that plugs into a car cigarette lighter port, or other connection to the vehicle's electrical system, for power. When a driver engages a cars' ignition, the alerting device will begin emitting an alert such as a sound or light within some period of time, e.g. 5-10 seconds of the vehicle's ignition being engaged. The sound or other alert will only stop after the driver has placed the mobile device into the designated area, e.g., into the device holster. If the driver removes the mobile device from the designated area (in this example, for example, removes the mobile device from a retaining holster) while they are driving, the driver will have a predetermined period of time to return the mobile device to the designated area of the vehicle (e.g., holster) before the device will begin emitting the sound. If the mobile device is not returned to the designated area within the predetermined period of time, the distraction reduction device will begin to emit the sound, thus prompting the driver to return the mobile device to the designated area of the vehicle (e.g., holster) to stop the sound. Device operation may be activated by various events such as detecting the mobile device within the vehicle. For example, the distraction reduction device may be initially triggered by the placement of the mobile device within a designated retention holster.

Referring to FIG. 1, an example implementation will now be described. A distraction reduction device (DRD) 100 includes a holster 101 with an upper slot 102 into which may be inserted a PED 110. A portion of PED 110 is retained within a central cavity or void within holster 101 while some portion of the device 110 may extend out from the holster. A retaining mechanism may be included to secure and/or lock PED 110 in holster 101 such as by physical engagement of the outer case or PED 110 such as by a biased tab or an electromagnetic locking device. PED may be any of a variety of objects, whether or not electronic or otherwise, which access to should be limited to avoid distraction of the vehicle operator, e.g. driver. Example PEDs include, but are not limited to, a cellular telephone, a GPS receiver, personal digital assistant (PDA), video camera, etc.

DRD 100 may further include a mechanism for alerting an operator that PED 110 is not secured in or retained by holster 101, such as a speaker 103 for emitting an audible warning message, tone, or other sound, or a visible cue such as a light. Switch 104 may be used to activate DRD 100, silence an alert message, or perform other functions. Holster 101 may be configured such that, when PED 110 is inserted access to distracting features and/or functionalities are physically blocked and inaccessible and/or electronically disabled. For example, a display portion of PED 110 may be located within holster 101 so as to block viewing of the display. Similarly, a keypad portion used to make outgoing calls may be inaccessible or deactivated. However, keys for accepting an incoming call in a hands-free mode may be accessible, those keys being accessible at the upper portion of PED extending out of holster 101. Insertion of PED 110 may also initiate a reconfiguration of the user interface (e.g., keypad) so that only operable keys and functions are available to the operator on any portion of the device extending outside of the holster and accessible to the vehicle operator.

Figure 2:
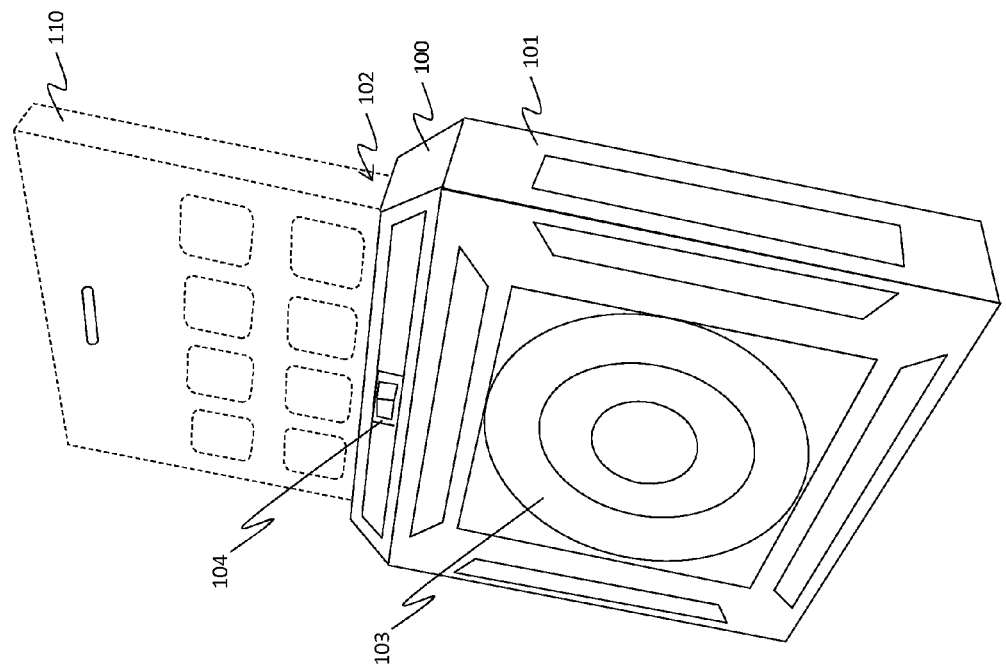
FIG. 2 is a rear perspective view of a vehicular-mountable device for retaining and inhibiting operation of a PED present within a vehicle.

According to an embodiment illustrated in FIG. 2, a combination mounting and power outlet plug may extend out from the rear of holster 101. According to this embodiment, a flexible "goose-neck" 106 is attached to a rear surface of holster 101, with a far end terminating in an electrical plug 105 compatible with, for example, auxiliary power (e.g., cigarette lighter) sockets typically present in motor vehicles. Alternative mounting are also contemplated including window suction mounts with any appropriate power cord and may further include holsters integrated into the structure of the vehicle itself (e.g., part of a central console or vehicle dashboard.) Similarly, power to the DRD may be supplied in various ways including by a power cord connected to the electrical system of the vehicle, internally mounted batteries, powered by the PED, etc.

Figure 3:
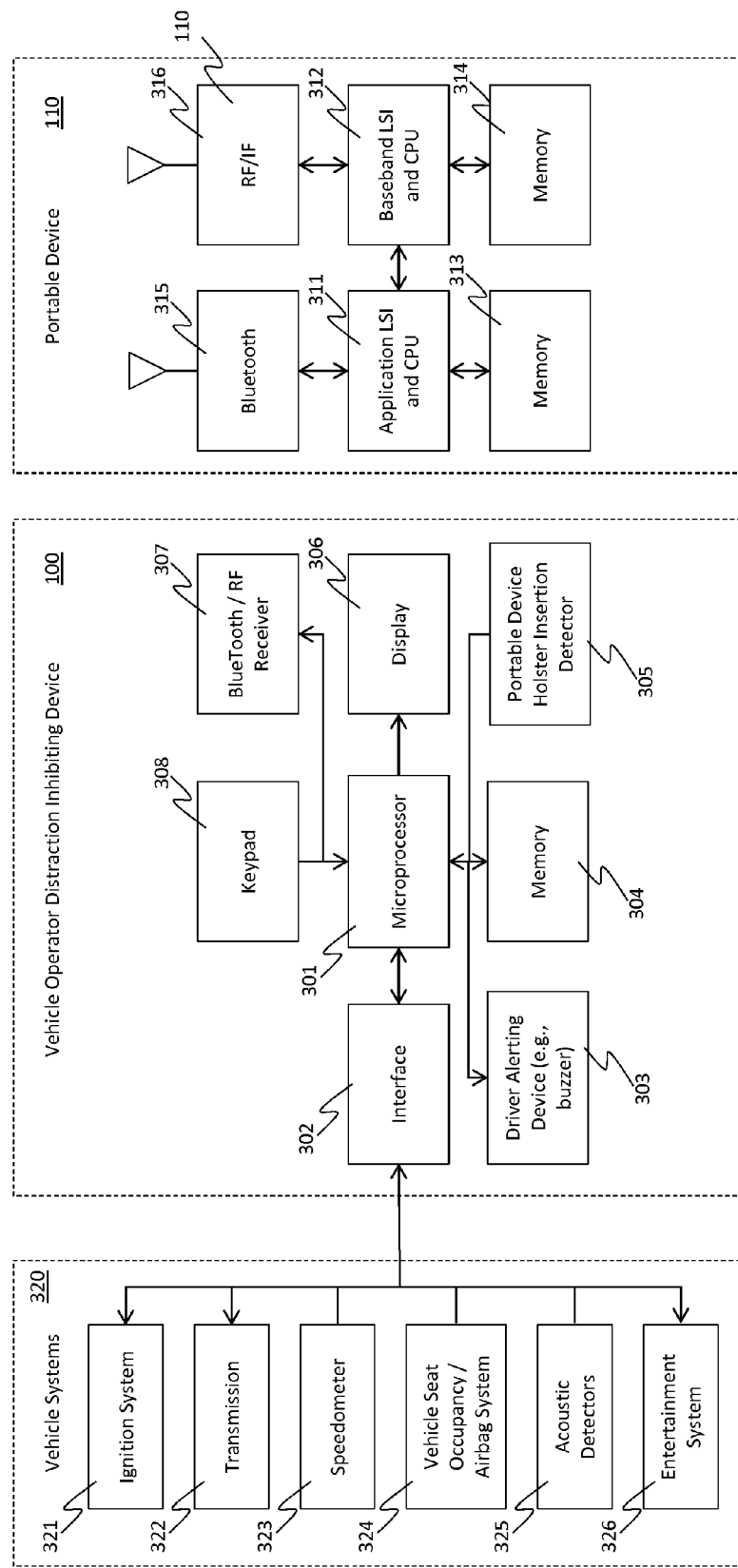
FIG. 3 is a block diagram of a vehicular-mountable device for retaining and inhibiting operation of a PED present within a vehicle.

FIG. 3 is a block diagram of one example implementation of a DRD 100. DRD 100 includes a microprocessor 301 responsive to instructions stored in memory 304 for performing operations described herein. Interface 302 may be included to connect DRD 100 to other systems including vehicle systems 320. The vehicular systems may provide information indicative of vehicle status to DRD 100 and provide the ability to limit or inhibit specified and/or predetermined vehicle operations and modes under certain conditions where the vehicle operator may be subject to distraction. DRD 100 further includes a vehicle operator (e.g., driver) and/or occupant alerting device such as an acoustic alerting device (voice, warning tone, etc.), visual indicator, etc. An insertion detector 305 senses when the PED is inserted into and is present in the holster. Although not shown, this may include a locking device to prevent or inhibit removal of the PED from the holster under certain conditions (e.g., during driving operations of the vehicle.) Display 306 may be used to show device status and provide additional information such as that transmitted by the PED which display may otherwise be hidden and not visible (e.g., information about an incoming call.) Keypad 308 may provide for control of the device and/or the PED. Bluetooth and RF receiver 307 may be used to detect the presence of PED 110 within the vehicle and may provide additional functionalities such as hands-free operation of the PED using a Bluetooth link and otherwise provide for communication between DRD 100 and PED 110.

Vehicle systems may include ignition system 321, vehicle transmission 322, speedometer 323, vehicle seat sensor (occupancy) and airbag system 324, acoustic detectors 325 and entertainment system 326. In the case of entertainment system 326, in addition to monitoring for distractions, DRD 100 may inhibit operation of the entertainment system when the PED is in use and/or provide alerts to the vehicle operator and/or other occupants (e.g., if the PED is removed from the holster while the vehicle is in operation.)

Figure 4:
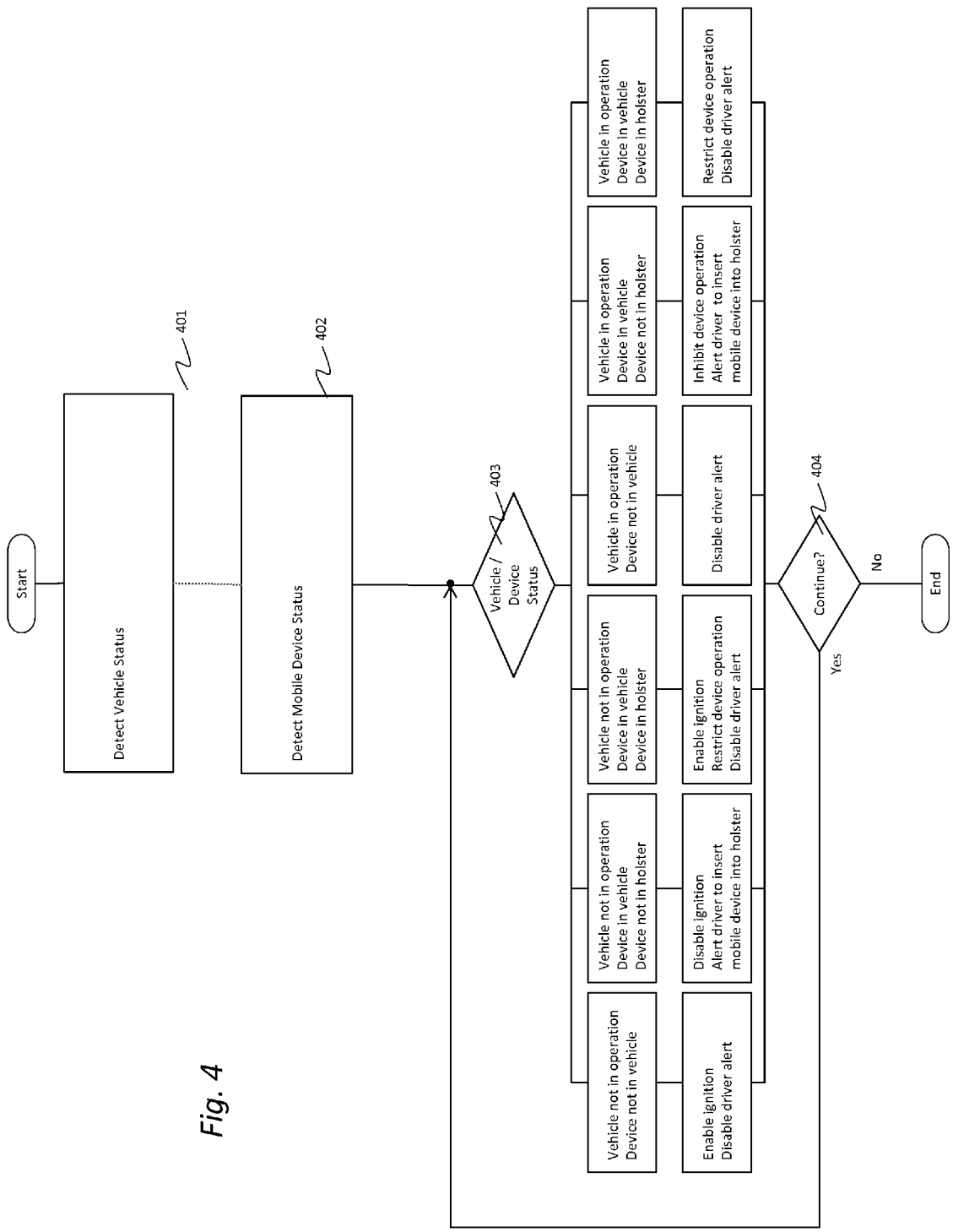
FIG. 4 is a flow diagram of the operation of a vehicular-mountable device for retaining and inhibiting operation of a PED present within a vehicle.

FIG. 4 is a flow diagram of steps in the operation of an example implementation of a DRD 100. DRD 100 may be initially activated upon power application from the vehicle when the operator turns on the vehicle's electrical system, may be operated in a sleep mode until detecting an event such as the presence of a PED inserted into holster 101 of DRD 100, or may be manually activated by operation of a power switch on DRD 100. At step 401 DRD 100 detects vehicle status to determine if conditions are present whereby any PED might be a distraction to the operator of a vehicle. These conditions may include status of the ignition system including ignition switch positions of off, accessories, run and start; vehicle transmission mode including park, neutral, reverse and drive; vehicle speed including stopped, slow, reverse and cruise; whether a passenger is detected occupying the front seat (e.g., by the airbag system); vehicle location (as detected by internal or external GPS) including whether the vehicle is being operated in a local (e.g., home) or distant location, in a construction zone or other area requiring heightened attention, and/or other specially defined areas; airbag deployment status and/or other indicators or an emergency situation such that functionalities of the PED should be restored or other action taken (e.g., automatic dialing of a cellular telephone with an emergency message describing the nature of the emergency (e.g., airbag deployment) and vehicle location via voice, text or otherwise); ambient environmental conditions such as silence, operation of a sound or video entertainment system, recognition of a voice command, or indication that a conversation is presently in progress within the vehicle.

Step 402 is depicted after step 401 but may be performed prior to, in parallel with or any other suitable order with respect to step 401. At step 402 a search is performed for a PED and its location ascertained. Thus, steps may be taken to determine whether a PED is to be considered present by default, by some initial insertion into holster 101 thereby activating the system, if a Bluetooth signal is detected from the device and/or a Bluetooth connection is established with the device; detection of a cellular or other RF signal together with any electronic serial number (ESN)/mobile equipment identifier (MEID)/mobile identification number (MIN)/or recognition of any other identification of the PED; and GPS location within or outside of the vehicle. Also determined is whether the PED is in holster 101 as may be detected by a variety of devices and steps including a tactile detector such as a contact switch or pressure sensor; a magnetic detector such as a magnetic relay or Hall effect detector, and optical detection using a light beam including by reflection or interruption of the light beam to a detector located within the holster.

Step/decision 403 determines what set of conditions has been detected at steps 401 and 402 and takes appropriate action as indicated in the condition sets and actions indicated in the diagram. For example if the vehicle is not in operation and no PED is detected, no action is required and/or the vehicles ignition is enabled and any driver alert is disabled. Conversely, if the vehicle is not in operation but the portable electronic is in the vehicle but outside the holster (or had been in but has been removed from the holster), then the vehicle's ignition may be disabled and the vehicle operator or driver alerted to insert the mobile electronic device into the holster. Note that, in the case of removal of the device from the holster or any other suitable circumstance, an appropriate delay may be provided prior to providing an alert. For example, a visual alert may be provided immediately upon removal of the PED from the holster but any audible alert may be delayed to provide for temporary or short-term (e.g., 5-10 seconds) viewing of the device's screen or other operations necessitating temporary removal of the device from the holster.

If the PED is present in the holster prior to starting of the vehicle, the ignition system may be enabled, alerts inhibited and, if appropriate, the PED caused to restrict certain operations, e.g. DRD 100 communicates via a Bluetooth interface to disable texting. Different actions may be taken if the vehicle is detected to be in operation. For example, it probably would not be prudent to disable the vehicle's ignition while the vehicle is in motion. Examples of these options are detailed in FIG. 4. At step 404, continuous monitoring is performed of the status of the PED and vehicle and appropriate action is taken by looping back to decision step 403.

The alert can also be external to the vehicle and be designed to alert others, and not just the operator of the vehicle. For example an external light on the vehicle can be illuminated or flash or the like. Such an external signal would indicate to others that the operator may be distracted (e.g., a driver is holding a mobile phone). Such an alert could be audible or visible or both. As an example, the light can be integrated into the brake light system.

The device also can be charged through the vehicle's electrical system, such as a car's cigarette lighter port, a USB port or other port that provides power from the vehicle's electrical system.

The foregoing examples have been presented for the purpose of illustration. They are not exhaustive and do not limit the claimed invention. Modifications and variations are possible in light of the above description or may be acquired from implementing such examples. For example, although one example implementation includes a separate holster, any area of the vehicle may be designated for storing and/or retention of the PED and may include any sensors and electronics to determine whether the portable device is positioned within or outside of the designated area. This may include sensors for sensing the weight of the device and determining if it is consistent with a particular device the location of which is to be monitored (e.g., the measured weight of the object is consistent with the programmed weight of a particular device such as a make and model cell phone.) As further example, the described implementation includes software, but the disclosed embodiments may be implemented as a combination of hardware and software or in firmware. Examples of hardware include various computing or processing systems, including personal computers, laptops, micro-processors, and the like. Additionally, although the foregoing examples are described as being stored in a memory associated with a microprocessor, one skilled in the art will appreciate that these aspects can also be stored on other types of computer-readable storage media, such as secondary storage devices, like hard disks, floppy disks, a CD-ROM, USB media, DVD, or other forms of RAM or ROM. Likewise other platforms for implementing devices according to various embodiments of the invention may be used including programmed logic arrays (PLAs), application specific integrated circuits (ASICs), discrete components, etc.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Python, PHP, XML, Java, C++, JavaScript, HTML, HTML/AJAX, Flex, Silverlight, or any other now known or later created programming language. One or more of such software sections or modules can be integrated into a computer system or existing browser software.

Other embodiments will be apparent to those skilled in the art from consideration of the specification and practice of the embodiments disclosed herein. The recitations in the claims are to be interpreted broadly based on the language employed in the claims and not limited to examples described in the present specification or during the prosecution of the application, which examples are to be construed non-exclusive. Further, the steps of the disclosed methods may be modified in any manner, including by reordering steps and/or inserting or deleting steps. It is intended, therefore, that the specification and examples be considered as exemplary only, with a true scope and spirit being indicated by the following claims and their full scope of equivalents.

What is claimed is:

1. A method for restricting operation, by an operator of a moving vehicle, of a mobile communication device, comprising:
   detecting engagement of an ignition system of the moving vehicle;
   detecting whether the mobile communication device is located in a designated area of the moving vehicle, wherein the mobile communication device is out of view of the operator of the moving vehicle when the mobile communication device is in the designated area during operation of the moving vehicle by the operator; and
   activating an alerting device providing an audible alert in response to the detecting steps.

2. The method of claim 1 wherein the designated area of the includes a holster for holding the mobile device.

3. The method of claim 2 further comprising:
   detecting an initial insertion of the mobile device into the holster and, in response, enabling said alerting device.

4. The method of claim 1 further comprising:
   delaying said step of activating for a predetermined time period after detecting a removal of the mobile device from the designated area of the vehicle.

5. The method of claim 1 wherein said alerting device is activated in response to (i) detecting the engagement of the ignition system and (ii) detecting that the mobile device is not located within the designated area of the vehicle.

6. The method of claim 1 wherein said step of detecting whether the mobile device is located in the designated area of the vehicle includes detecting an insertion of the mobile device into a holster and a removal of the mobile device from the holster.

7. A method for restricting operation, by an operator of a moving vehicle, of a mobile communication device located within the moving vehicle, comprising:
- detecting whether the mobile communication device is located within a designated area of the moving vehicle, wherein a display of the mobile communication device is out of view of the operator of the moving vehicle when the mobile communication device is in the designated area during operation of the moving vehicle by the operator;
- setting a warning condition if the mobile communication device is not positioned in the designated area; and
- providing an audible alert in response to said warning condition.

8. The method of claim 7 wherein the designated area of the vehicle comprises a holster mounted in the vehicle, the holster configured to limit access to and operation of the mobile device.

9. The method of claim 8, further comprising:
- detecting an initial insertion of the mobile device into the holster and, in response, enabling the step of setting the warning condition if the mobile device is removed from the holster.

10. The method of claim 8, further comprising:
- detecting whether the mobile device is located within the vehicle;
- setting a warning condition if
  (i) the mobile device is detected within the vehicle, and
  (ii) the mobile device is not detected to be positioned in the holster; and
- alerting an occupant of the vehicle in response to said warning condition.

11. The method of claim 10, further comprising the steps of:
- detecting an operational status of the vehicle; and
- setting a warning condition if
  (i) the mobile device is detected within the vehicle,
  (ii) the mobile device is not detected to be positioned in the holster, and
  (iii) the operational status of the vehicle is detected to be one in which an operation of the mobile device is to be restricted; and
- alerting an occupant of the vehicle in response to said warning condition.

12. The method of claim 11, further comprising the steps of:
- detecting an operational status of the vehicle indicating that the vehicle is not being driven; and
- in response to said warning condition, inhibiting an operation of the vehicle wherein the operation is necessary for the vehicle to be driven.

13. The method of claim 12, wherein the step of detecting an operational status of the vehicle includes detecting a condition selected from the group consisting of
  (i) an ignition switch position (a) other than on, run and start and (b) including off, lock and accessories,
  (ii) a non-driving transmission operational state (a) other than drive, forward and reverse and (b) including park and neutral,
  (iii) a vehicle speed of less than a threshold value,
  (iv) an unoccupied driver position, and
  (v) a deployed airbag; and
- the step of inhibiting an operation of the vehicle includes inhibiting an operation of a component of the vehicle selected from the group of components consisting of:
  (i) an ignition system of the vehicle wherein the inhibited operation is necessary for the vehicle to be driven including an ignition state of on, run and start,
  (ii) a transmission of the vehicle wherein the inhibited operation includes operating the transmission in drive, forward and reverse.

14. The method of claim 8, wherein the holster includes a barrier impeding access to one or more control mechanisms of the mobile device when the mobile device is positioned in the holster.

15. The method of claim 8, further comprising a locking mechanism that operates to inhibit removal of the mobile device from the holster when the vehicle is being driven.

16. A system for restricting operation, by an operator of a moving vehicle, of a mobile communication device, comprising:
- a sensor configured to detect engagement of an ignition system of the moving vehicle;
- a sensor configured to detect whether the mobile communication device is located within a designated area of the moving vehicle, wherein the mobile communication device is out of reach of the operator of the moving vehicle when the mobile communication device is in the designated area during operation of the moving vehicle by the operator; and
- an alerting device response to the sensors and configured to provide an audible alert when the mobile communication device is absent from the designated area.

17. The system of claim 16 further comprising:
- a circuit configured to detect an initial positioning of the mobile device in the designated location of the vehicle and, in response, enabling said alerting device.

18. The system of claim 16 further comprising a holster corresponding to the designated location in the vehicle, the holster configured to receive and retain the mobile device.

19. The system of claim 16 further comprising:
- a delay circuit configured to delay activation of the alerting device for a predetermined time period after detecting a removal of the mobile device from the designated area of the vehicle.

20. The system of claim 16 wherein said alerting device is activated in response to (i) detecting the engagement of the ignition system and (ii) detecting that the mobile device has not yet been positioned in the designated location.

21. The system of claim 16 wherein said sensor configured to detect whether the mobile device is positioned in the designated area of the vehicle, the sensor configured to detect an insertion of the mobile device into the designated area of the vehicle and a removal of the mobile device from the designated area.

22. The system of claim 16 wherein said sensor configured to detect whether the mobile device is inserted in a holster, the holster configured to detect an insertion of the mobile device into the holster and a removal of the mobile device from the holster.

23. The system of claim 22 wherein the holster includes a locking mechanism configured to inhibit removal of the mobile device from the holster when the vehicle is being driven.

24. The system of claim 22 wherein the holster includes a mounting mechanism that engages a power outlet of the vehicle to support the holster and provide power to the sensors and alerting device.

* * * * *